L. M. FULLER.
AUTOMOBILE BODY CONSTRUCTION.
APPLICATION FILED SEPT. 12, 1910.
982,422.
Patented Jan. 24, 1911.
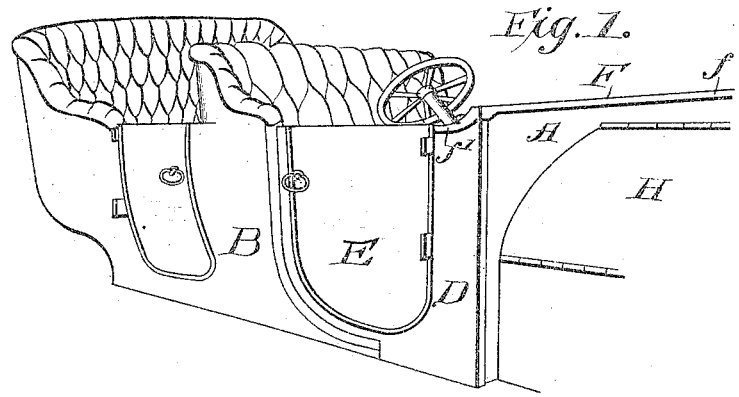
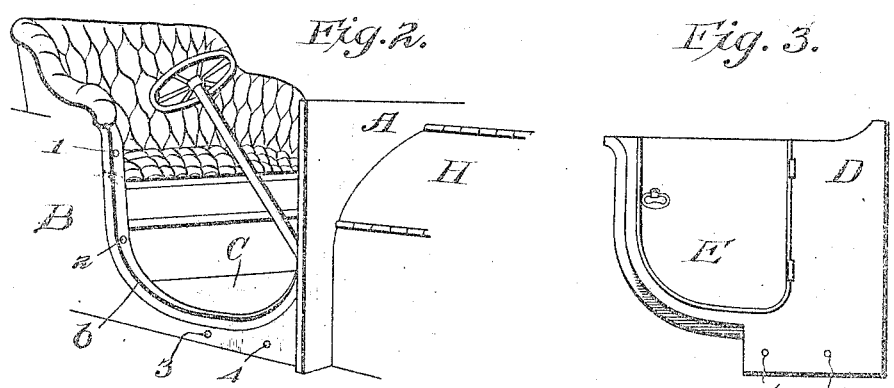
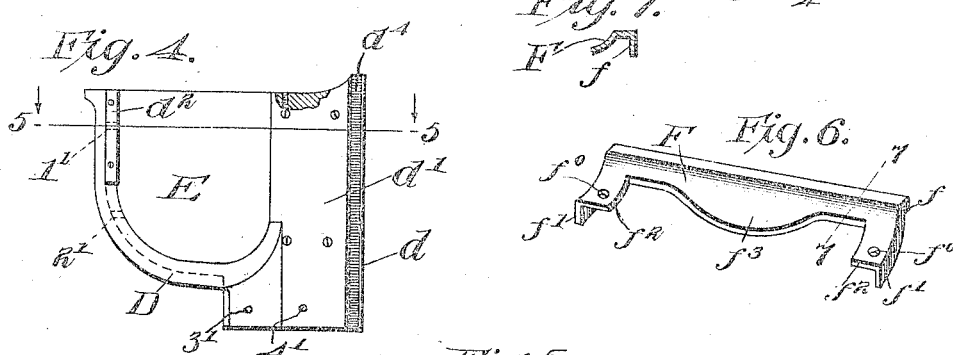
Witnesses
Byron B. Colling.
Edwin J. Beller.
Inventor
Lawson M. Fuller,
by Wilkinson, Fisher &
Witherspoon, Attorneys

UNITED STATES PATENT OFFICE.

LAWSON M. FULLER, OF MOLINE, ILLINOIS, ASSIGNOR TO VELIE MOTOR VEHICLE COMPANY, INCORPORATED, OF MOLINE, ILLINOIS, A CORPORATION OF ILLINOIS.

AUTOMOBILE-BODY CONSTRUCTION.

982,422.  Specification of Letters Patent.  Patented Jan. 24, 1911.

Application filed September 12, 1910. Serial No. 581,564.

*To all whom it may concern:*

Be it known that I, LAWSON M. FULLER, a citizen of the United States, residing at Moline, in the county of Rock Island and State of Illinois, have invented certain new and useful Improvements in Automobile-Body Construction; and I do hereby declare the following to be a full, clear, and exact description of the invention, such as will enable others skilled in the art to which it appertains to make and use the same.

My present invention relates to improvements in automobile body construction, and it consists in combining with an automobile frame a pair of removable panels each containing a door adapted to close the sides of the automobile in front of the front seat, or to leave the same open as may be desired.

My invention comprises a pair of removable front panels, one for either side of the car, and a shroud or connecting plate, connecting these two panels and with them making a complete and harmonious combination that may be pleasing to the eye and of utility as well.

Recent automobile design includes as its most distinctive body feature an inclosed front. This inclosure of the space between the front seat and the dash-board is extremely desirable for the inclement fall, winter and spring months on account of cold, snow, wind, etc. The proximity of the motor with its burned and highly heated gases to the occupants of the front seat renders this part of the car especially comfortable in the winter months when inclosed. But due to this same proximity to the motor, the inclosure of the seats in the hot months of summer is especially undesirable.

My invention is applicable to any form of body, but for convenience in description, I will disclose it in connection with the touring car type of body herein shown.

Reference is had to the accompanying drawings, in which the same parts are indicated by the same letters and numerals throughout the several views.

Figure 1 is a perspective view showing one of the panels with the connecting plate mounted on the car body and with the door closed. Fig. 2 is a perspective view showing the panel and connecting plate removed. Fig. 3 is a detail showing the panel detached from the car. Fig. 4 is a detail showing the opposite side of the panel from that shown in Fig. 3, parts being broken away. Fig. 5, shows a section through Fig. 4 along the line 5—5 of said figure and looking down. Fig. 6, is a perspective view of the connecting plate, and, Fig. 7, shows a section along the line 7—7 of Fig. 6.

A represents the dashboard, B the car body, C the floor of the car body, and D represents the panel in which the door E is hinged. F represents the connecting plate which goes over the dashboard and connects the two panels together, and H represents the hood. The car body is provided with metal anchor plates $b$, over which the panels are mounted and to which they are secured by means of bolts through the holes 1, 2 of the plates and 1', 2' of the panel, as shown in Figs. 2 and 4. Bolt holes 3 and 4 are also provided in the car body front to register with the bolt holes 3' and 4' of the panel. The panel is provided with a flange $d$, which passes in front of the dashboard, leaving a groove $d^4$ into which the dashboard projects. The major part of the panel is preferably made of metal reinforced with wood, as shown in Fig. 5, and flanged as at $d$ in said figure.

Felt or other packing material is placed between the joints where necessary to avoid rattling or to prevent abrasion. On the inside of the panel, wooden strips $d'$, $d^2$ are preferably provided for convenience in attaching the hinges, locks and upholstering thereto.

Each panel is put in place and secured by bolts through the bolts holes 1, 2, 3 and 4, and 1', 2', 3' and 4', as already described. The dashboard projects into the groove $d^4$ and is braced by the flange $d$. The connecting plate F is then placed across the top of the dashboard, with the dashboard projecting in rear of the flange $f$ and the flanges $f'$ projecting along the upper forward corner of the panel, as shown in Fig. 1. The curved portion $f^2$ of the connecting plate is provided with a bolt hole $f^0$, and a bolt through the same connects the said plate to the panel. The plate thus serves as a tie plate for binding together the dashboard and the two side panels, and forms a rigid connection.

It will be obvious that the said plate and the said panels may be readily applied or removed upon putting in or taking out the said bolts.

In order to secure a neat effect, it is desirable to have the bolt heads as much as possible concealed, or to use ornamental bolt heads, and the plate F may be made of ornamental design, as shown at $f^3$ in Fig. 6.

It will be obvious that various modifications might be made in the herein described apparatus and various changes made in the combinations and arrangements of parts, which could be used without departing from the spirit of my invention.

What I claim and desire to secure by Letters Patent of the United States is:—

The combination with an automobile body provided with metallic facing strips and a dash-board, of a panel for each side provided with flanges adapted to engage said facing strips and said dash-board, and a connecting plate provided with flanges adapted to project over the top edge of said dash-board and over the edges of said panels and to lock the two panels and the dash-board together, substantially as described.

In testimony whereof, I affix my signature, in presence of two witnesses.

LAWSON M. FULLER.

Witnesses:
C. D. BRITTON,
R. I. STURM.